US010498586B2

(12) United States Patent
Serrano Garcia et al.

(10) Patent No.: US 10,498,586 B2
(45) Date of Patent: Dec. 3, 2019

(54) FAULT DIAGNOSIS IN NETWORKS

(71) Applicant: Telefonaktiebolaget LM Ericsson (publ), Stockholm (SE)

(72) Inventors: Inmaculada Serrano Garcia, Málaga (ES); Raquel Barco Moreno, Málaga (ES); Emil Jatib Khatib, Málaga (ES); Pablo Munoz Luengo, Málaga (ES); Isabel De La Bandera Cascales, Málaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 15/568,554

(22) PCT Filed: Apr. 24, 2015

(86) PCT No.: PCT/EP2015/058924

§ 371 (c)(1),
(2) Date: Oct. 23, 2017

(87) PCT Pub. No.: WO2016/169616

PCT Pub. Date: Oct. 27, 2016

(65) Prior Publication Data

US 2018/0115455 A1 Apr. 26, 2018

(51) Int. Cl.
*H04L 12/24* (2006.01)
*H04L 12/26* (2006.01)

(52) U.S. Cl.
CPC .......... *H04L 41/0631* (2013.01); *H04L 41/16* (2013.01); *H04L 43/022* (2013.01); *H04L 43/0817* (2013.01); *H04L 43/0823* (2013.01)

(58) Field of Classification Search
USPC .......................................................... 714/37
See application file for complete search history.

(56) References Cited

U.S. PATENT DOCUMENTS 7,028,225 B2 * 4/2006 Maso .................. G06F 11/3438 702/186
7,756,959 B1 * 7/2010 Beshai .................... H04L 45/22 370/200

(Continued)

FOREIGN PATENT DOCUMENTS

WO 2013 148785 A1 10/2013
WO 2014 040633 A1 3/2014

OTHER PUBLICATIONS

Advanced Analysis Methods for 3G Cellular Networks by Jaana Laiho et al.; IEEE Transactions on Wireless Communications, vol. 4, No. 3—May 2005.

(Continued)

*Primary Examiner* — Kamini B Patel
(74) *Attorney, Agent, or Firm* — Baker Botts, LLP

(57) ABSTRACT

An apparatus and corresponding method for determining a cause of a fault in a network. The apparatus comprises a means for receiving, which may be a receiver, configured to receive a plurality of time separated samples of a primary network metric that are indicative of a fault in the network, and a plurality of time separated samples of one or more indicator network metrics. The apparatus comprises a means for correlating, which may be a correlator, configured to determine one or more metric correlation values relating to dependences between the samples of the primary network metric and the samples of each of the one or more indicator network metrics. The correlator is further configured to determine one or more fault correlation values relating to dependences between the one or more metric correlation values and a plurality of stored metric correlation values associated with a fault cause. The apparatus comprises a means for fault determining, which may be a fault deter- (Continued)

miner, configured to determine a cause of the fault based on the one or more fault correlation values.

20 Claims, 5 Drawing Sheets

(56) References Cited

U.S. PATENT DOCUMENTS

| | | | | |
|---|---|---|---|---|
| 2005/0240943 | A1* | 10/2005 | Smith | G06F 9/465 719/328 |
| 2006/0031463 | A1* | 2/2006 | Bird | H04L 41/046 709/224 |
| 2008/0244095 | A1* | 10/2008 | Vos | H04L 12/5692 709/250 |
| 2010/0153787 | A1* | 6/2010 | Beattie, Jr. | H04L 41/0681 714/43 |
| 2011/0090811 | A1* | 4/2011 | Ekelin | H04L 41/0896 370/252 |
| 2013/0343213 | A1* | 12/2013 | Reynolds | H04L 43/045 370/252 |
| 2014/0189436 | A1 | 7/2014 | Sadaphal et al. | |
| 2016/0007899 | A1* | 1/2016 | Durkee | G09B 23/28 600/544 |
| 2018/0027004 | A1* | 1/2018 | Huang | H04L 63/1425 726/23 |

OTHER PUBLICATIONS

An Automatic Detection and Diagnosis Framework for Mobile Communication Systems by Peter Szilagyi and Szaboles Novaczki; IEEE Transactions on Network and Service Management, vol. 9, No. 2—Jun. 2012.

An Improved Anomaly Detection and Diagnosis Framework for Mobile Network Operators by Szaboles Novaczki, Nokia Siemens Networks Research, Hungary—2013.

Automated Diagnosis for UMTS Networks Using Bayesian Network Approach by Rana M. Khanafer et al.; IEEE Transactions on Vehicular Technology, vol. 57, No. 4—Jul. 2008.

PCT International Search Report for International application No. PCT/EP2015/058924—dated Jan. 21, 2016.

PCT Written Opinion of the International Searching Authority for International application No. PCT/EP2015/058924—dated Jan. 21, 2016.

* cited by examiner

FAULT DIAGNOSIS IN NETWORKS

PRIORITY

This nonprovisional application is a U.S. National Stage Filing under 35 U.S.C. § 371 of International Patent Application Serial No. PCT/EP2015/058924 filed Apr. 24, 2015, and entitled "FAULT DIAGNOSIS IN NETWORKS", which is hereby incorporated by reference in its entirety.

TECHNICAL FIELD

The invention relates to methods and apparatus for determining causes of faults in computer and/or telecommunications networks.

BACKGROUND

The increasing complexity of the architecture of cellular networks has made network management more complicated. Self-Organizing Networks are those networks whose management is carried out with a high level of automation. In the field of Self-Healing or automatic troubleshooting of Self-Organizing Networks, an enormous diversity of performance indicators, counters, configuration parameters and alarms has led operators to search for intelligent and automatic techniques that cope with faults in a more efficient manner, making the network more reliable.

A purpose of Self-Healing is to solve or mitigate faults which can be solved or mitigated automatically by triggering appropriate recovery appropriate recovery actions. One of the main barriers to Self-Healing research is the difficulty to know the effects of any given fault, which is the fundamental basis to build an effective diagnosis system.

Fault diagnosis in Self-Organizing Networks, which may also be called root-cause analysis, is a key function in fault management that allows the identification of the fault causes. In this sense, some efforts have been devoted to the development of usable automatic diagnosis systems that improve the reliability of the network.

"An Automatic Detection and Diagnosis Framework for Mobile Communication Systems", P. Szilagyi and S. Novaczki, IEEE Transactions on Network and Service Management, 9(2), 184-197, 2012, discloses an integrated detection and diagnosis framework that identifies anomalies and finds the most probable root cause.

Improvements to this framework are covered in "An Improved Anomaly Detection and Diagnosis Framework for Mobile Network Operators", S. Nováczki, In Proc. of 9th International Conference on the Design of Reliable Communication Networks (DRCN), 2013, where more sophisticated profiling and detection capabilities have been included.

WO2014040633A1 discloses a method for determining faults through pattern clustering.

"System and method for root cause analysis of mobile network performance problems", J. Cao, L. Erran Li, T. Bu and S. Wu Sanders, WO 2013148785 A1, October 2013 discloses a method for identifying the causes of changes in performance indicators by analyzing the correlation with a plurality of counters.

Fault diagnosis in cellular networks has also been approached by applying different mathematical techniques, such as in "Automated diagnosis for UMTS networks using Bayesian network approach", R. M. Khanafer, B. Solana, J. Triola, R. Barco, L. Moltsen, Z. Altman and P. Lázaro, IEEE Transactions on Vehicular Technology, 57(4), 2451-2461, 2008, and in "Advanced analysis methods for 3G cellular networks", J. Laiho, K. Raivio, P. Lehtimäki, K. Hätönen, and O. Simula, IEEE Transactions on Wireless Communications, 4(3), 930-942, 2005.

Many existing Self-Healing solutions comprise reasonably primitive approaches to fault diagnosis, while the more complex alternatives require a lot of information about the faults that is not available in most cases, e.g. the conditional probability density function of metrics (symptoms) for given fault causes. Due to these shortcomings automatic diagnosis systems, beyond scientific literature, have not been deployed in live networks.

In known systems, fault diagnosis may be on the basis of how consistently a metric is associated with a fault. In particular, the association of a metric with a fault is considered to be fully consistent if the metric is always present in (or always missing from) a metric report relating to the fault. The metric report may include all metrics that deviate from their usual behavior at the time of a fault. A drawback of this approach is that, in many cases, the effect on the metrics is not a clear deviation from a normal range, but may be a small change (e.g. a peak or a step) in the temporal evolution of the metric that would be disregarded. The more information is available, the better performance of a fault diagnosis system. For example, in the case of a cell outage, any impact on neighboring cells, even if small (e.g. a slight increase in traffic), can be used in fault diagnosis.

In known systems, this issue is even more problematic due to the use of thresholds. For example, an anomaly class may collect metrics having similar effects and each class is then characterized by an anomaly class indicator that is activated when the corresponding metrics violate predefined thresholds. Since the anomaly behavior in the metrics is given by reaching abnormal values, the information related to smaller variations and specific degraded patterns is ignored. In addition, in this case the use of thresholds leads to a more drastic decision when determining whether a metric is degraded or not.

In other systems, diagnosis is carried out by means of classification/regression trees, which are used to predict membership of event counters in one or more classes of performance metrics of interest. However, this kind of solution is typically based on fixed thresholds, so that similar drawbacks as before are derived from this approach.

The application of Bayesian Networks has an important limitation. In particular, models must contain all the possible states of the network and their associated probabilities. The construction of this model is a complex task where knowledge acquisition becomes an extremely challenging issue and is normally not feasible given the lack of time of troubleshooting experts.

Other systems use Self-Organizing maps. For example, proposed methods based on this technique facilitate the diagnosis when the cause of the problem is unknown. Since a large number of labeled cases (i.e. identified faults associated with their symptoms) is hard to get from recently deployed networks, this is a reasonable starting point for the diagnosis. However, there can be deviations in metrics (e.g. due to traffic variations) that are not a problem but the Self-Organizing Maps would classify them as a potential problem, causing some confusion to the troubleshooting expert.

SUMMARY

Exemplary methods and apparatus are aimed at alleviating or solving one or more of the problems mentioned above or any other problem with the art.

According to the invention in a first aspect, there is provided an apparatus for determining a cause of a fault in a network. The apparatus comprises a means for receiving, which may be a receiver, configured to receive a plurality of time separated samples of a primary network metric that are indicative of a fault in the network, and a plurality of time separated samples of one or more indicator network metrics. The apparatus comprises a means for correlating, which may be a correlator, configured to determine one or more metric correlation values relating to dependences between the samples of the primary network metric and the samples of each of the one or more indicator network metrics. The correlator is further configured to determine one or more fault correlation values relating to dependences between the one or more metric correlation values and a plurality of stored metric correlation values associated with a fault cause. The apparatus comprises a means for fault determining, which may be a fault determiner, configured to determine a cause of the fault based on the one or more fault correlation values.

Optionally, the apparatus further comprises a means for weighting determining, which may be a weighting determiner, configured to determine a weighting factor, wherein the correlator is configured to determine the one or more fault correlation values using a weighted correlation based on the weighting factor.

Optionally, the weighting determiner is configured to determine the weighting factor based on one or more of the stored metric correlation values and data indicating a relevance of one or more indicator network metrics to each fault cause.

Optionally, the correlator is configured to shift the samples of the one or more indicator network metrics before determining the metric correlation values.

Optionally, the correlator is configured to determine a plurality of candidate metric correlation values relating to dependences between the samples of the primary network metric and the samples of one or more of the indicator network metrics, each candidate correlation value based on differently shifted samples of the one or more indicator network metrics, and wherein the correlator is further configured to select the candidate metric correlation value having the highest correlation value as the metric correlation value.

Optionally, the plurality of time separated samples of one or more indicator network metrics comprise samples from indicator network metrics measured in a plurality of telecommunications cells, and the apparatus further comprises a means for matrix building, which may be a matrix builder, configured to build a vector of metric correlation values ordered based on the telecommunications cell in which a corresponding indicator network metric was measured.

Optionally, the matrix builder is configured to group together metric correlation values relating to the same telecommunications cell.

Optionally, the matrix builder is configured to determine an average metric correlation value relating to each telecommunications cell and to order the grouped together metric correlation values based on the average metric correlation value.

Optionally, the fault determiner is configured to determine that the cause of the fault is a fault cause associated with the highest fault correlation value.

Optionally, the apparatus further comprises a means for learning, which may be a learning entity, configured to determine updated stored metric correlation values based on the determined cause of the fault and the stored metric correlation values.

Optionally, the learning entity is configured to determine the updated stored metric correlation values using an infinite impulse response filter.

Optionally, the apparatus further comprises a means for fault rectifying, which may be a fault rectifier, configured to control a transmitter to transmit a signal to an entity in the network to rectify the determined cause of the fault.

Optionally, the one or more metric correlation values are components of a metric correlation vector, and the one or more fault correlation values are corresponding components of a fault correlation vector.

According to the invention in a second aspect, there is provided a method for determining a cause of a fault in a network. The method comprises receiving, at a receiver, a plurality of time separated samples of a primary network metric that are indicative of a fault in the network, and a plurality of time separated samples of one or more indicator network metrics. The method comprises determining, by a correlator, one or more metric correlation values relating to dependences between the samples of the primary network metric and the samples of each of the one or more indicator network metrics. The method comprises determining, by the correlator, one or more fault correlation values relating to dependences between the one or more metric correlation values and a plurality of stored metric correlation values associated with a fault cause. The method comprises determining, by a fault determiner, a cause of the fault based on the one or more fault correlation values.

Optionally, the method further comprises determining, by a weighting determiner, a weighting factor, the step of determining, by the correlator, the one or more fault correlation values is undertaken using a weighted correlation based on the weighting factor.

Optionally, the weighting factor is determined based on one or more of the stored metric correlation values and data indicating a relevance of one or more indicator network metrics to each fault cause.

Optionally, the method further comprises shifting, by the correlator, the samples of the one or more indicator network metrics before determining the metric correlation values.

Optionally, the method further comprises determining, by the correlator, a plurality of candidate metric correlation values relating to dependences between the samples of the primary network metric and the samples of one or more of the indicator network metrics, each candidate correlation value based on differently shifted samples of the one or more indicator network metrics; and selecting, by the correlator, the candidate metric correlation value having the highest correlation value as the metric correlation value.

Optionally, the plurality of time separated samples of one or more indicator network metrics comprise samples from indicator network metrics measured in a plurality of telecommunications cells, and the method further comprises building, by a matrix builder, a vector of metric correlation values ordered based on the telecommunications cell in which a corresponding indicator network metric was measured.

Optionally, the matrix builder groups together metric correlation values relating to the same telecommunications cell.

Optionally, the matrix builder determines an average metric correlation value relating to each telecommunications cell and orders the grouped together metric correlation values based on the average metric correlation value.

Optionally, the fault determiner determines that the cause of the fault is a fault cause associated with the highest fault correlation value.

Optionally, the method further comprises determining, by a learning entity, updated stored metric correlation values based on the determined cause of the fault and the stored metric correlation values.

Optionally, the learning entity determines the updated stored metric correlation values using an infinite impulse response filter.

Optionally, the method further comprises controlling, by a fault rectifier, a transmitter to transmit a signal to an entity in the network to rectify the determined cause of the fault.

Optionally, the one or more metric correlation values are components of a metric correlation vector, and wherein the one or more fault correlation values are corresponding components of a fault correlation vector.

According to the invention in a third aspect, there is provided a computer program comprising instructions which, when executed on at least one processor, cause the at least one processor to carry out the method above.

According to the invention in a fourth aspect, there is provided a carrier containing the computer program above, wherein the carrier is one of an electronic signal, optical signal, radio signal, or non-transitory computer readable storage medium.

BRIEF DESCRIPTION OF THE DRAWINGS

Exemplary embodiments of the invention are disclosed herein with reference to the accompanying drawings, in which.

DETAILED DESCRIPTION

Figure 1:
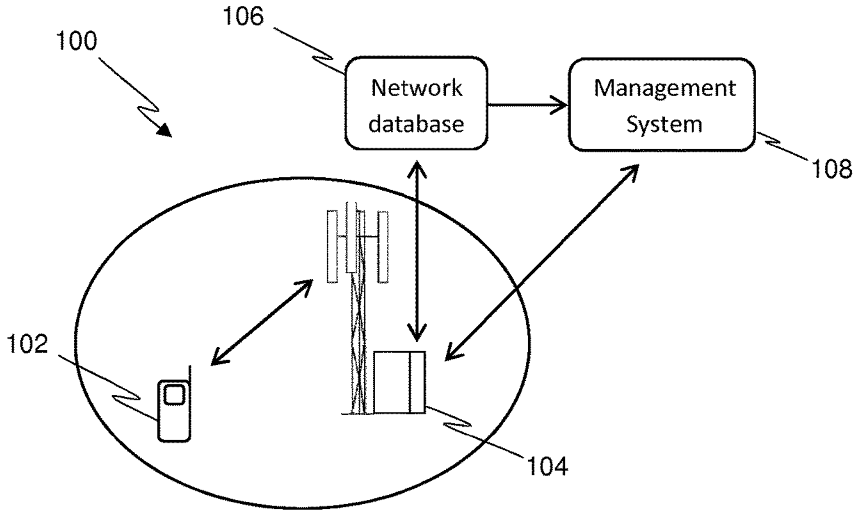
FIG. 1 shows an architecture diagram of a network.

Generally, disclosed herein are methods and apparatus for automatic fault diagnosis in networks based on temporal analysis of network metrics. In particular exemplary methods and apparatus, a correlation over time between network metrics is evaluated and compared with stored patterns in order to determine a root cause of a fault. The term "correlation" as used herein encompasses any predictable relationship or dependence between network metrics. Network metrics can include performance indicators, counters, mobile traces, alarms, configuration parameters and geographical data.

The methods disclosed herein may be preceded by a fault detection phase, where a network metric is monitored as a potential symptom of an unknown fault. Anomalies may be detected in the network metric and can be either a deviation of the network metric from a typical value or abnormal behavior of the network metric over time. The network metric to be monitored may be called the primary metric and is an input to exemplary methods and apparatus disclosed.

Generally, exemplary methods and apparatus disclosed may comprise or be configured to perform calculation of a correlation indicator that relates to (e.g. identifies) the dependence or covariance between a primary network metric and one or more indicator network metrics. This analysis can be made at different levels, such as intra-cell and inter-cell. To compute the correlation values, a certain time interval of the metrics is considered, meaning that not only the current value of the metric is used, but also a vector of samples representing the temporal evolution. The correlation value shows how the primary metric changes over time with the indicator metric. Thus, the methods and apparatus disclosed overcome the main drawbacks of the existing solutions. The result of this process is a correlation vector containing the respective correlation values.

Exemplary methods and apparatus may also calculate a weighted correlation indicator between the obtained correlation vector and corresponding correlation vectors for fault cases stored in a database.

The similarity between the current correlation vector and one or more stored correlation vectors for a previous fault case is determined in order to find the cause of the fault. The weights used for the calculation make it possible to give more or less importance to some metrics, depending on several aspects, e.g. predefined "expert" knowledge (discussed below) or the overall impact of the fault on the respective cell. In this sense, existing solutions have severe limitations in the context of heterogeneous networks, where a plurality of neighboring cells can support the diagnosis.

Exemplary methods and apparatus make better use of new user-level metrics for fault diagnosis. Recent developments to manage mobile traces open the possibility of searching for similarities between metrics aggregated at different levels (e.g. user-level and cell-level) that have significant potential for fault diagnosis in networks. In addition, exemplary methods and apparatus make better use of metrics in neighboring cells, as they may provide a mechanism for giving more or less importance to metrics in a neighboring cell as a function of the overall impact on the neighboring cell. Exemplary methods and apparatus also make better use of metrics in the context of heterogeneous networks, as they take advantage of cells with overlapping coverage (different radio access technologies, cell size, etc.), common in heterogeneous networks, since their correlation under a fault is typically greater than in homogeneous networks. Methods and apparatus disclosed reduce diagnosis error rate by the use of temporal analyses based on correlation between metrics, which makes the diagnosis method considerably more effective than those only measuring deviations from normal behavior. There is also a lower impact of delays in metric correlation. In some cases, the impact of an event (e.g. a change in a configuration parameter) on another metric (e.g. a performance indicator) can be delayed with respect to the occurrence of the event, but the methods and apparatus disclosed herein may take into account this issue by shifting one of the metrics before calculating the correlation. Exemplary methods and apparatus may also incorporate expert knowledge to determine a weighted correlation giving more or less importance to some metrics depending on the specific fault or the scenario.

FIG. 1 shows a network 100 comprising a user equipment (UE) 102, a base station 104, a network database 106 and a management system 108. The UE 102 may communicate with the base station 104 to gain access to a telecommunications network (not shown), which may, for example, be a third generation partnership project (3GPP) network. The base station 104 may be monitored by a network management system, which may comprise an operation support system (OSS). The network management system comprises a network database 106 and a management system 108. The management system 108 and the network database 106 are in electrical communication with the base station 104. Raw data from the cell of the base station 104 is transmitted to the network database 106 and/or the management system 108. The raw data may comprise the primary metrics and indicator metrics that may be used in exemplary methods and apparatus disclosed herein.

Exemplary methods may be implemented on the management system 108. Exemplary apparatus configured to undertake the methods disclosed herein may be a management system 108.

Figure 2:
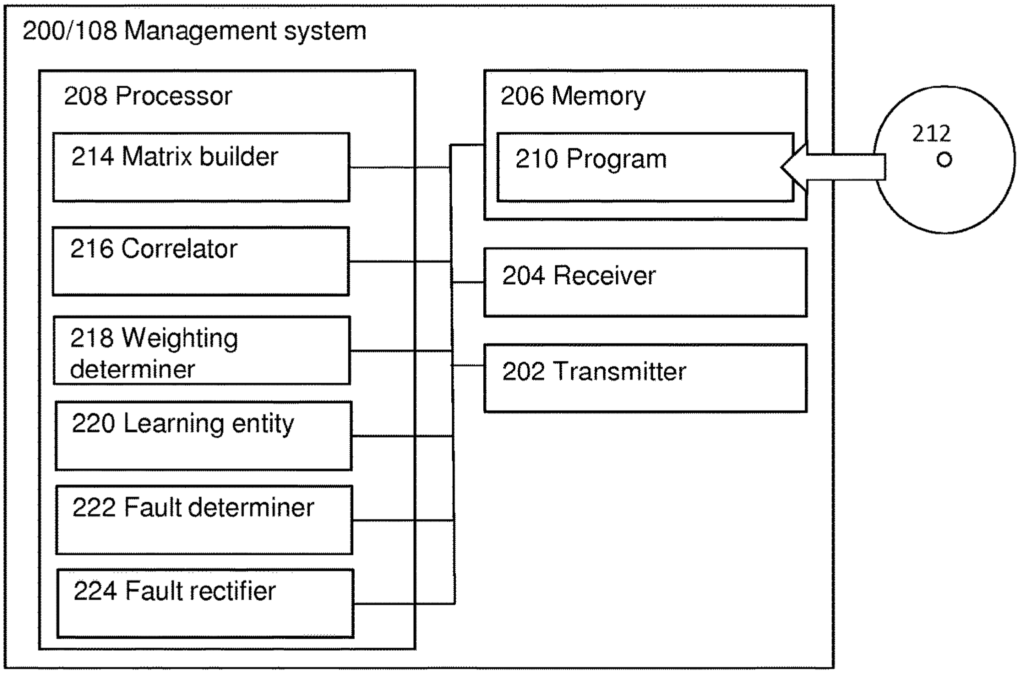
FIG. 2 shows a schematic representation of a management system.

FIG. 2 shows a schematic representation of a management system 200, which may be part of an OSS and may be used in the architecture of FIG. 1. The management system 200 comprises a transmitter 202 and a receiver 204. The transmitter 202 and receiver 204 may be in data communication with other network entities such as UEs, servers and/or functions in a telecommunications network and are configured to transmit and receive data accordingly.

The management system 200 further comprises a memory 206 and a processor 208. The memory 206 may comprise a non-volatile memory and/or a volatile memory. The memory 206 may have a computer program 210 stored therein. The computer program 210 may be configured to undertake the methods disclosed herein. The computer program 210 may be loaded in the memory 206 from a non-transitory computer readable medium 212, on which the computer program is stored. The processor 208 is configured to undertake one or more of the functions of a matrix builder 214, correlator 216, weighting determiner 218, learning entity 220, fault determiner 222 and fault rectifier 224, as set out below.

Each of the transmitter 202 and receiver 204, memory 206, processor 208, matrix builder 214, correlator 216, weighting determiner 218, learning entity 220, fault determiner 222 and fault rectifier 224 is in data communication with the other features 202, 204, 206, 208, 210, 214, 216, 218, 220, 222, 224 of the management system 200. The management system 200 can be implemented as a combination of computer hardware and software. In particular, the matrix builder 214, correlator 216, weighting determiner 218, learning entity 220, fault determiner 222 and fault rectifier 224 may be implemented as software configured to run on the processor 208. The memory 206 stores the various programs/executable files that are implemented by a processor 208, and also provides a storage unit for any required data. The programs/executable files stored in the memory 206, and implemented by the processor 208, can include the matrix builder 214, correlator 216, weighting determiner 218, learning entity 220, fault determiner 222 and fault rectifier 224, but are not limited to such.

Figure 3:
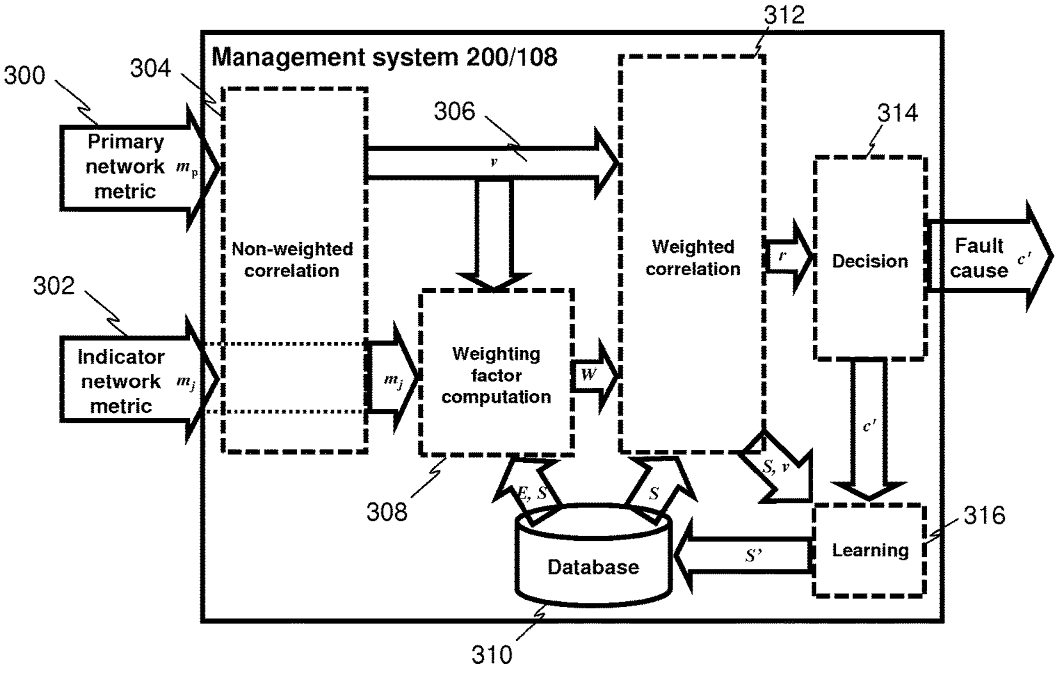
FIG. 3 shows a schematic representation of a management system showing a method flow.

FIG. 3 is a representation of an exemplary method for fault diagnosis. FIG. 3 is explained in conjunction with FIGS. 4*a-c*, which shows a flow diagram of an exemplary method for fault diagnosis. The method may be undertaken in a management system 108, 200 of a network 100.

Data relating to one or more network metrics is received 400 at the receiver 204 of the management system 108, 200. The received data comprises a plurality of time separated samples $m_p$ of one or more primary network metrics. The samples ($m_p$) may form components of a primary metric vector $m_p$ 300. The received data comprises a plurality of time separated samples $m_j$ of one or more indicator network metrics. The samples $rn_j$ may form components of an indicator metric vector ($m_j$) 302. Primary network metrics are network metrics the anomalous behavior of which has been found in a previous stage of fault detection to be indicative of a fault. In cellular networks, there are some important metrics normally identified as Key Performance Indicators (KPIs) that can be used in a fault detection phase to monitor the health of the network, typically related to accessibility or retainability. This kind of metrics can be used as primary metrics, since any degradation of these metrics could evidence the existence of a fault in the network.

The received network metrics data comprise metric data spanning a time period and therefore comprises a plurality of samples of a metric each separated in time. The time interval between samples may be substantially equal across the time period.

A vector of network metrics m is built 402 by a matrix builder 214. The matrix builder 214 may also shift the built vector m and may build 404 new vectors. Alternatively, a correlator 216 may shift the built vector m and may build 404 the new vectors. Shifting the built vector m by the correlator is advantageous since less memory is required to store the new vectors until the correlator carries out a correlation, as further described. For the avoidance of doubt, a "vector" is considered to be a subgroup of a "matrix". That is, a vector is a one-dimensional matrix. Accordingly, the matrix builder 214 is also a vector builder and the correlator 216 may be also a vector builder.

The network metrics can be classified into different categories depending on:

The nature of the network metric: network metrics can be performance indicators, counters, mobile traces, alarms, configuration parameters and geographical data. It is important that all the metrics have the same granularity in the time domain. For example, sometimes the values of the configuration parameters are stored per day, while the values of the performance indicators are calculated and stored per hour. In those cases, it is necessary to process the event that indicates a change in the parameter (e.g. the hour at which the change happens) and generate the corresponding vector. For example, if the antenna downtilt parameter is changed from 4 to 7°, this can be expressed as:

$$m_{downtilt}=(4,4, \ldots ,7, \ldots ,7,7)$$

The type of the cell from which the network metric is obtained: the primary network metric is obtained from a primary cell and may be correlated not only with indicator metrics of the same cell (intra-cell correlation), but also with indicator metrics of one or more neighboring cells (inter-cell correlation). In addition, in a heterogeneous network, the inter-cell correlation can be classified into different categories depending on the relation to the primary cell: intra-frequency/inter-frequency if the neighboring cell uses the same/different frequency carrier as the primary cell, and intra-technology/inter-technology if the neighboring cell uses the same/different radio access technology as the primary cell. Typically, in the presence of a fault, co-located cells or cells with overlapping service areas have more similar behavior than separate cells. This is an advantage of heterogeneous networks from a diagnosis perspective.

To determine which cells are neighbors, the mobile operator can provide a list of adjacencies. If this list is not available, the neighbors can be determined by using handover-related information. In particular, two cells are considered to be relevant neighbors if the number of handovers between them is considerably high. In this sense, a parameter $N_{minHO}$ is defined to establish the minimum number of handovers per unit time between two cells to be considered as neighbors. In addition, the maximum number of neighbors $N_{neigh}$ must also be defined. If the maximum allowed is exceeded, then the cells with lower number of handovers are discarded.

The delay/advance of the indicator network metric with respect to the primary metric: a cause-and-effect relationship between the primary network metric and the indicator network metric can lead to some delay between a change in the primary network metric and the indicator network metric. For example, a change in a configuration parameter may progressively overload the Computer Processing Unit (CPU), resulting in a degradation of the metric CPU congestion one or two samples later. For this reason, in exemplary methods and apparatus, each indicator network metric is also shifted one or more samples with respect to the primary network metric. Such a shift can be positive (a delay), zero or negative (an advance). The effectiveness of this approach is linked to a low probability of the occurrence of two faults close in time.

Mobile operators use a plurality of network metrics that, in some cases, are derived from other metrics. For example, the counter number of drops is included in the definition of the performance indicator retainability, so that the same information is reflected by different indicator network metrics. In exemplary methods and apparatus, it is assumed that the intrinsic correlation between network metrics is avoided as far as possible by selecting network metrics that do not totally or partially measure the same magnitude.

Figure 4A:
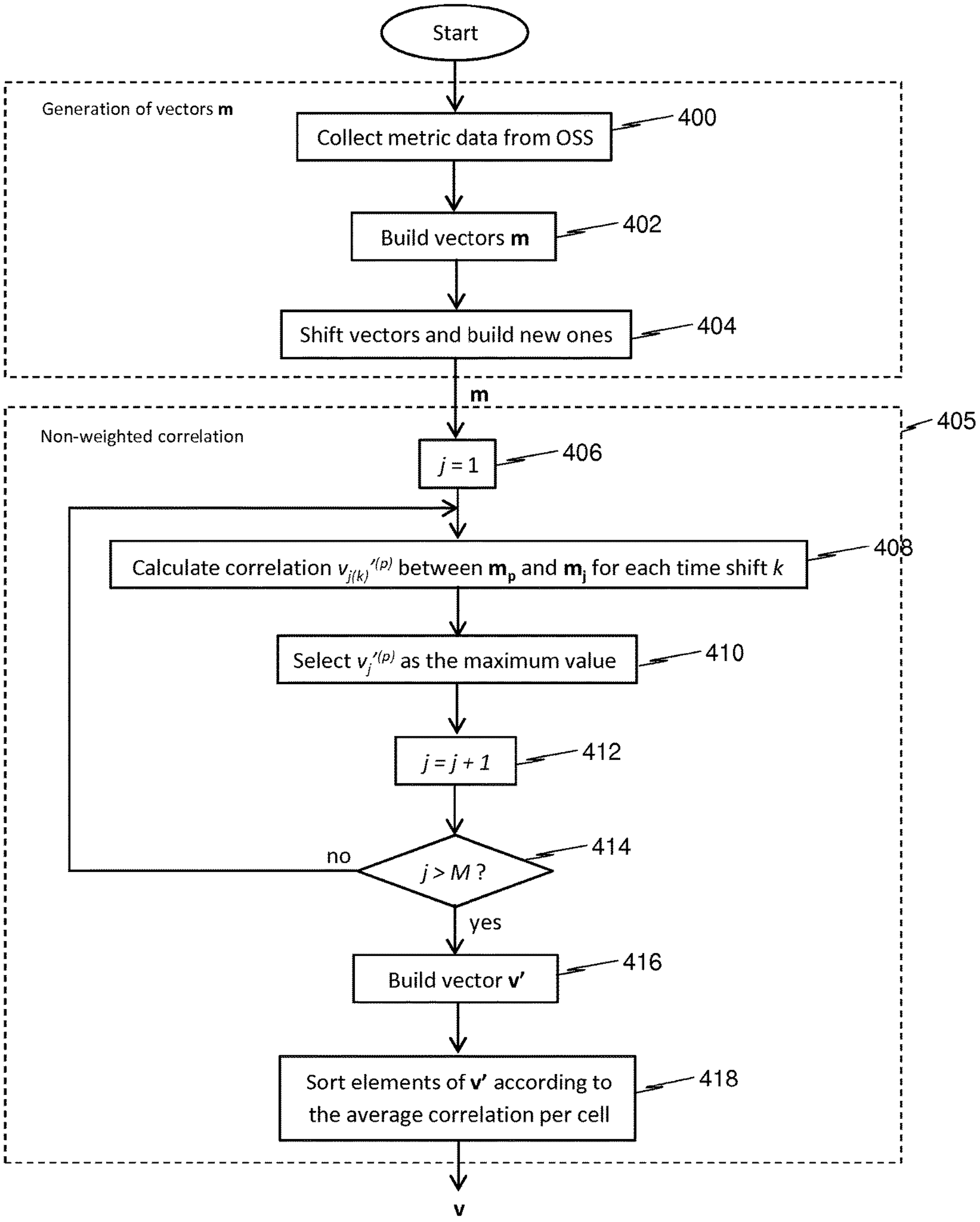
FIGS. 4*a*-*c* show a flow diagram of a method for determining a fault in a network.

The correlator 216 determines a correlation between the primary network metric vector $m_p$ and at least one indicator network metric vector $m_j$, which is shown by the methods steps in box 405 of FIG. 4*a* and 304 of FIG. 3. The correlation results in one or more metric correlation values v, each metric correlation value defining a correlation between the samples of the primary network metric and the samples of an indicator network metric. The metric correlation values V may form components of a metric correlation vector v. The correlation may be a non-weighted correlation.

A counter j is set 406 to one and a correlation between $m_p$ and $m_j$ is calculated 408 for each sample in the vector $m_j$, where $m_j$ is a vector of samples of the jth indicator network metric. This is repeated, if time shift is considered, for each time shift and the matrix builder 214 and/or the correlator 216 may be configured to shift the vector $m_j$, as mentioned above. The time shift having the highest correlation value is determined 410 by the correlator 216 to be the correlation value between the primary network metric and the indicator network metric, as described below.

The correlator 216 may make use of any suitable existing correlation indicator algorithm. In exemplary methods and apparatus, the absolute value of a Pearson correlation coefficient is used as an example of a correlation indicator, although other correlation indicators may be used. The absolute value of a Pearson correlation coefficient is always between 0 and +1, indicating high correlation when the value is close to +1. A correlation function, corr, is used to calculate each initial metric correlation value $v'^{(p)}_j$ between $m_p$ and $m_j$. Considering that M is the number of indicator network metrics, the computation of the initial metric correlation value can be expressed as:

$$v''^{(p)}_j = \mathrm{corr}(m_p, m_j) \text{ for } j = 1 \ldots M$$

For simplicity, let us consider that p=1 and $j \in \{1 \ldots M\}$ so that the primary network metric is also treated as an indicator network metric. Grouping the initial metric correlation values results in an initial metric correlation vector v', defined as:

$$v'^{(p)} = \Big(\overbrace{v'^{(p)}_1, v'^{(p)}_2}^{\text{primary cell}}, \overbrace{\overbrace{\ldots, \ldots, \ldots, \ldots}^{1}, \ldots, \overbrace{\ldots, \ldots, v'^{(p)}_M}^{N_{neigh}}}^{\text{neighboring cells}}\Big)$$

The initial metric correlation vector $v'^{(p)}$ is composed of the initial metric correlation values of all selected indicator network metrics (performance indicators, alarms, etc.) for both the intra-cell and inter-cell cases in the order shown above, i.e. the first elements of the vector $v'^{(p)}$ correspond to the indicator network metrics of the primary cell and the rest of elements correspond to the indicator network metrics belonging to neighboring cells. Note that the first element of $v'^{(p)}$ corresponds to the correlation of the primary network metric with itself. The order of the metric correlation values of the indicator network metrics belonging to the primary cell may be decided by the operator. In addition, the metric correlation values of the indicator network metrics belonging to a neighboring cell may be sorted in the same manner as the indicator network metrics belonging to the primary cell.

In the case of considering time shifted versions of a given metric, some additional calculations may be needed. To explain this, let z be the maximum magnitude of the shift, which in the example discussed below is 2. The time shifts −2, −1, 0, +1 and +2 lead to indicator network metric vectors $m_{j(-2)}$, $m_{j(-1)}$, $m_{j(0)}$, $m_{j(+1)}$ and $m_{j(+2)}$ and produce candidate initial metric correlation values $v'^{(p)}_{j(-2)}$, $v'^{(p)}_{j(-1)}$, $v'^{(p)}_{j(0)}$, $v'^{(p)}_{j(+1)}$ and $v'^{(p)}_{j(+2)}$, respectively, where the subscript indicates the magnitude and direction of the time shift. The value $v'^{(p)}_j$ is determined to be the maximum candidate initial metric correlation value of all the time shifted candidate metric correlation values, i.e.:

$$v'^{(p)}_j = \max\{v'^{(p)}_{j(k)}\} \text{ for } k = 2, -1 \ldots, +2$$

The above process may be undertaken to obtain the metric correlation values discussed below. That is, the determination of candidates and the selection of the maximum candidate may be used to generate the sorted metric correlation vector v.

The counter j is incremented 412 and compared 414 to the number of indicator metrics M. The determination of a correlation value discussed above is repeated for each indicator network metric.

When metric correlation values between the primary network metric each indicator network metric have been calculated, the matrix builder 214 or the correlator 216 builds 416 the vector v' from those correlation values and may sort 418 the elements of v' according to the average correlation values per telecommunications cell. This is carried out for neighboring cells, as the metrics of the primary cell are located at the beginning of the vector v'. In particular, for any indicator network metric j of each neighboring cell, the following calculation is carried out:

$$\mathrm{mean}\left(v'^{(p)}_{\lambda(j)}, \ldots v'^{(p)}_{\lambda(j)+M/(1+N_{neigh})}\right)$$

where $M/(1+N_{neigh})$ is the number of metrics per cell and λ(j) is a function that returns the position of the first metric in v' that belongs to the same neighboring cell as the metric j. In other words, for a given network metric j, the average of the metric correlation values of all the indicator network metrics belonging to the same neighboring cell is calculated and the order of the neighboring cells in v' is modified according to the obtained average. In exemplary methods and apparatus, the matrix builder 214 may sort the vector v' such that the indicator network metrics of the neighboring cell whose average metric correlation value is the greatest are located immediately after the primary cell. The indicator network metrics of the remaining neighboring cells are sorted in order of the highest average correlation to the lowest average correlation. The new vector 306 is denoted by $v^{(p)}$, where:

$$v^{(p)} = (\underbrace{v_1^{(p)}, v_2^{(p)}, \ldots}_{\text{primary cell}}, \overbrace{\underbrace{\ldots, \ldots, \ldots}_{1'}, \ldots, \underbrace{\ldots, \ldots, \ldots, v_M^{(p)}}_{N'_{neigh}}}^{\text{neighbor cells}})$$

Figure 4B:
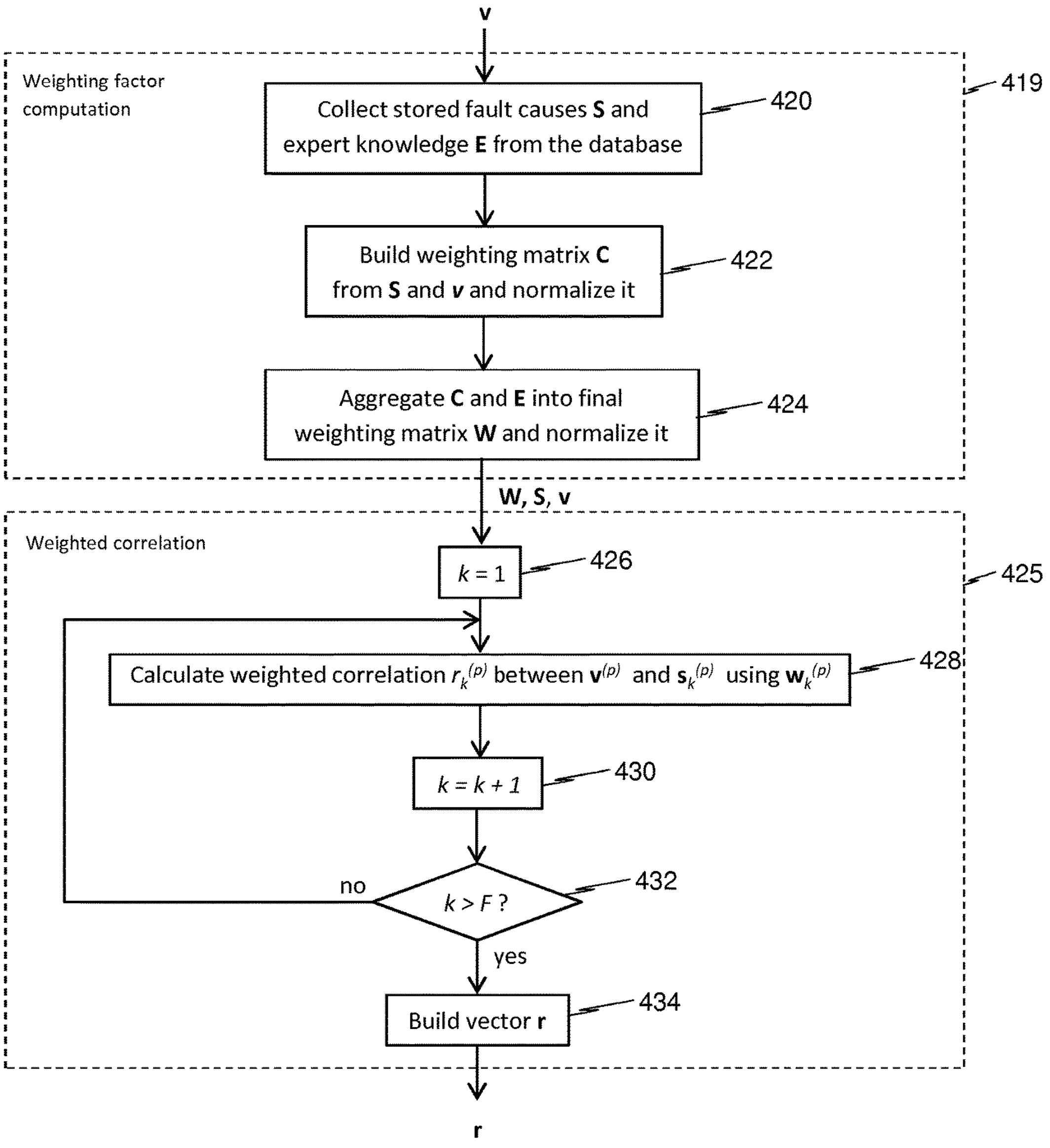

A weighting determiner 218 may determine a weighting factor for a weighted correlation based on the steps in box 419 of FIG. 4*b*. A database 310, which may be internal to the management system 108, 200, contains fault correlation values for stored fault causes S and expert knowledge E. The fault correlation values for the stored fault causes may comprise information on the correlation between the primary network metric and one or more indicator network metrics for past fault occurrences. The expert knowledge includes the information that can be used to build the weighting factor as explained below.

The variable $S^{(p)}$ may be a matrix where each row $s_k^{(p)}$ represents a vector of the metric correlation values for a specific fault cause k given a primary network metric p. Therefore, the values in each row $s_k^{(p)}$ may correspond to the values in $v^{(p)}$. Initially, the vector $s_k^{(p)}$ can be formed based on data from one occurrence of a given fault. When a new case of the same fault is diagnosed, this vector may be updated by a learning entity 220 as explained below. Taking F as the total number of stored fault causes, the matrix $S^{(p)}$ can be expressed as:

$$S^{(p)} = \begin{pmatrix} s_1^{(p)} \\ s_2^{(p)} \\ \ldots \\ s_F^{(p)} \end{pmatrix} = \begin{pmatrix} s_{11}^{(p)} & s_{12}^{(p)} & & \\ s_{21}^{(p)} & \ldots & & \\ & & \ldots & \\ & & & s_{FM}^{(p)} \end{pmatrix}$$

The element $s_{kj}^{(p)}$ is a correlation value between the primary network metric p and the indicator network metric j both under fault cause k. The order of the network metrics in vector $s^{(p)}$ is the same as in $v^{(p)}$, i.e. the first network metrics belong to the primary cell (intra-cell case). Since the primary network metric can be different for each occurrence of the fault, a matrix $S^{(p)}$ should be defined for each primary network metric p. In general, the number of potential primary network metrics is low, as operators typically focus their attention on a few performance indicators to detect anomalous behaviors.

The variable E represents expert knowledge that can be included in the system to support fault diagnosis. This variable is a matrix of the same dimensions as $S^{(p)}$, formally expressed as:

$$E = \begin{pmatrix} e_1 \\ e_2 \\ \ldots \\ e_F \end{pmatrix} = \begin{pmatrix} e_{11} & e_{12} & & \\ e_{21} & \ldots & & \\ & & \ldots & \\ & & & e_{FM} \end{pmatrix}$$

The operator can use E as a mask for the weighted correlation, i.e. the element $e_{kj}$ is set to 0 if an operator considers that indicator network metric j does not provide valuable information in respect of fault cause k, while it is set to a certain value if the indicator network metric is considered to be relevant. The higher the magnitude of the value $e_{kj}$, the more relevant the indicator network metric is to the fault cause. The elements of E can take values in a certain range to give relative importance to each indicator network metric. In this sense, the operator can give more importance to specific indicator network metrics (e.g. performance indicators) or to indicator network metrics from a specific cell (e.g. the primary cell). In addition, each vector $e_k$ may be normalized as follows:

$$\sum_{j=1}^{M} e_{kj} = 1. \tag{11}$$

Once the vector $v^{(p)}$ is generated, the following step may be the calculation 308 of the weighting factor W that will be used to compute a weighted correlation between the metric correlation vectors v and S. This may be termed a fault correlation vector comprising a plurality of fault correlation values. An exemplary method of calculating the weighting factor is shown in box 419 of FIG. 4*b*. As shown in FIG. 3, the weighting factor may be derived from different inputs. Inputs may correspond to the information provided in the metric correlation values of S and v and the expert knowledge E. A request for stored fault cause data S and expert knowledge data E is transmitted to the database 310 and that data is received in response 420. A weighting matrix C is built 422 by the matrix builder 214, based on S and v. The weighting matrix C may be normalized. The final weighting factor W is determined by the weighting determiner 218 and may incorporate the expert knowledge E. This may be done by aggregating 424 C and E. The final weighting factor W may be normalized. This can be mathematically expressed as:

$$W^{(p)} = f(C^{(p)}, E) = \begin{pmatrix} w_1^{(p)} \\ w_2^{(p)} \\ \ldots \\ w_F^{(p)} \end{pmatrix} = \begin{pmatrix} w_{11}^{(p)} & w_{12}^{(p)} & & \\ w_{21}^{(p)} & \ldots & & \\ & & \ldots & \\ & & & w_{FM}^{(p)} \end{pmatrix}.$$

where $C^{(p)}$ contains the weight or relative importance of metrics based on the information of correlation values in v and S, and f( ) is the function that combines the two weights $C^{(p)}$ and E to produce a new weighting factor W that fulfills the following normalization condition:

$$\sum_{j=1}^{M} w_{kj}^{(p)} = 1,$$

where $w^{(p)}{}_{kj}$ is the weight for the correlation value between the primary network metric p and the indicator network metric j under fault k.

The matrix $C^{(p)}$ is used to establish the relative importance of a network metric regarding the overall impact of the fault on the respective cell. This matrix is defined as follows:

$$C^{(p)} = \begin{pmatrix} c_1^{(p)} \\ c_2^{(p)} \\ \dots \\ c_F^{(p)} \end{pmatrix} = \begin{pmatrix} c_{11}^{(p)} & c_{12}^{(p)} & & \\ c_{21}^{(p)} & \dots & & \\ & & \dots & \\ & & & c_{FM}^{(p)} \end{pmatrix}.$$

For a certain cell, the average of the correlation values between the primary network metric and the indicator network metrics of that cell determines whether the fault has a great impact on the cell or not. To build the matrix $C^{(p)}$, the average of the correlation values per cell (primary cell included) for both the stored fault cases S and the input fault case v, i.e. the metric correlation vector v, may first be calculated. The minimum value (denoted by min) between these two cases is selected so that the less correlated value establishes the importance given to the correspondent cell. The minimum operator is used to reduce the impact of those cells whose correlation to the primary network metric is very low. Formally, to calculate the non-normalized element $c'^{(p)}_{kj}$, the following equation may be used:

$$c'^{(p)}_{kj} = \min \left\{ \text{mean}\left(v^{(p)}_{\lambda(j)}, \dots v^{(p)}_{\lambda(j)+M/(1+N_{neigh})}\right), \text{mean}\left(s^{(p)}_{k,\lambda(j)}, \dots s^{(p)}_{k,\lambda(j)+M/(1+N_{neigh})}\right) \right\}$$

where $M/(1+N_{neigh})$ is the number of network metrics per cell and $\lambda(j)$ is a function that returns the position of the first metric in $v^{(p)}$ and $s^{(p)}_k$ that belongs to the same neighboring cell as the indicator network metric j. Each vector $c^{(p)}_k$ of the final matrix $C^{(p)}$ may be normalized, in which case the element $c^{(p)}_{kj}$, is determined by:

$$c^{(p)}_{kj} = \frac{c'^{(p)}_{kj}}{\sum_{r=1}^{M} c^{(p)}_{kr}}$$

With this exemplary determination of the matrix $C^{(p)}$, a function f( ) that aggregates 424 $C^{(p)}$ and E to produce $W^{(p)}$ and at the same normalizes $W^{(p)}$ is given by the following expression:

$$w^{(p)}_{kj} = f\left(c^{(p)}_{kj}, e_{kj}\right) = \frac{c^{(p)}_{kj} e_{kj}}{\sum_{r=1}^{M} c^{(p)}_{kr} e_{kr}}.$$

In exemplary methods and apparatus, other variables in addition to C and E can be aggregated to the model in order to improve the diagnosis. This information, derived from metrics, can be, for example:

- Geographical data: border cells (i.e. those located on the edge of the network) are less suitable for diagnosis, since their metrics are more likely to be degraded. In addition, neighbor cells that are located too far from the primary cell can be penalized by giving them a lower weight.
- Traffic-related metrics: cells with relatively low traffic (or traffic lower than a threshold) should receive minor attention since their metrics may not be statistically significant.

The correlator 216 determines a fault correlation vector $r^{(p)}$ 312 (which may be weighted) between $v^{(p)}$ and $S^{(p)}$ and comprises one or more fault correlation values—an exemplary method is shown in box 425 of FIG. 4*b*. The most common correlation and distance-based indicators can be used, provided that weights can be easily included in their original definition. In exemplary methods and apparatus, a variant of the Pearson correlation coefficient is used to determine a weighted fault correlation vector. A counter value k is set 426 to 1 and a weighted fault correlation value is calculated 428 for each stored fault cause k, for each primary network metric p. This is done by incrementing 430 the value k after each weighted correlation calculation 428 and repeating 432 steps 426-430 until the value k is greater than the value F, which represents the number of stored fault causes.

In exemplary methods and apparatus, based on the metric correlation vector $v^{(p)}$ of metric correlation values derived earlier, based on the weighting vector $w^{(p)}_k$ taken from the weighting factor matrix W and based on the vector $s_k^{(p)}$ of metric correlation values taken from the fault cause matrix S stored in the database 310, a weighted Pearson correlation coefficient $r_k^{(p)}$ may be calculated by the correlator 214 using equation below to determine a plurality of fault correlation values.

$$r^{(p)}_k = \frac{\sum_{j=1}^{M} w^{(p)}_{kj}\left(v^{(p)}_j - \overline{v}^{(p)}_k\right)\left(s^{(p)}_{kj} - \overline{s}^{(p)}_k\right)}{\sqrt{\sum_{j=1}^{M} w^{(p)}_{kj}\left(v^{(p)}_j - \overline{v}^{(p)}_k\right)^2 \sum_{j=1}^{M} w^{(p)}_{kj}\left(s^{(p)}_{kj} - \overline{s}^{(p)}_k\right)^2}} = \frac{\sum_{j=1}^{M} w^{(p)}_{kj} v^{(p)}_j s^{(p)}_{kj} - \overline{v}^{(p)}_k \overline{s}^{(p)}_k}{\sqrt{\sum_{j=1}^{M} w^{(p)}_{kj} v^{(p)2}_j - \overline{v}^{(p)2}_k}\sqrt{\sum_{j=1}^{M} w^{(p)}_{kj} s^{(p)2}_{kj} - \overline{s}^{(p)2}_k}},$$

where $$\overline{v}^{(p)}_k = \sum_{j=1}^{M} w^{(p)}_{kj} v^{(p)}_j$$

and $$\overline{s}^{(p)}_k = \sum_{j=1}^{M} w^{(p)}_{kj} s^{(p)}_{kj}$$

By calculating this fault correlation value $r^{(p)}$ for all candidate fault causes k, a vector of fault correlation values $r^{(p)}$ is obtained and built 434 by the matrix builder 214. This may be done for each primary network metric.

$$r^{(p)} = (r_1^{(p)}, r_2^{(p)}, \dots, r_F^{(p)}).$$

The vector r represents the correlation of a primary network metric with each fault cause.

Methods and apparatus disclosed herein make a decision 314 as to the most likely cause c' of the fault based on r. The fault determiner 222 may determine that the fault is caused by the fault cause k having the highest fault correlation value in the vector r and optionally on that highest fault correlation value being above a threshold value. Formally, this may be expressed as:

$$c' = \underset{k}{\operatorname{argmax}}\, r_k^{(p)}$$

and $$r_{c'} > R_{thres}$$

where $R_{thres}$ is the threshold that establishes the sensitivity to undiagnosed faults.

Figure 4C:
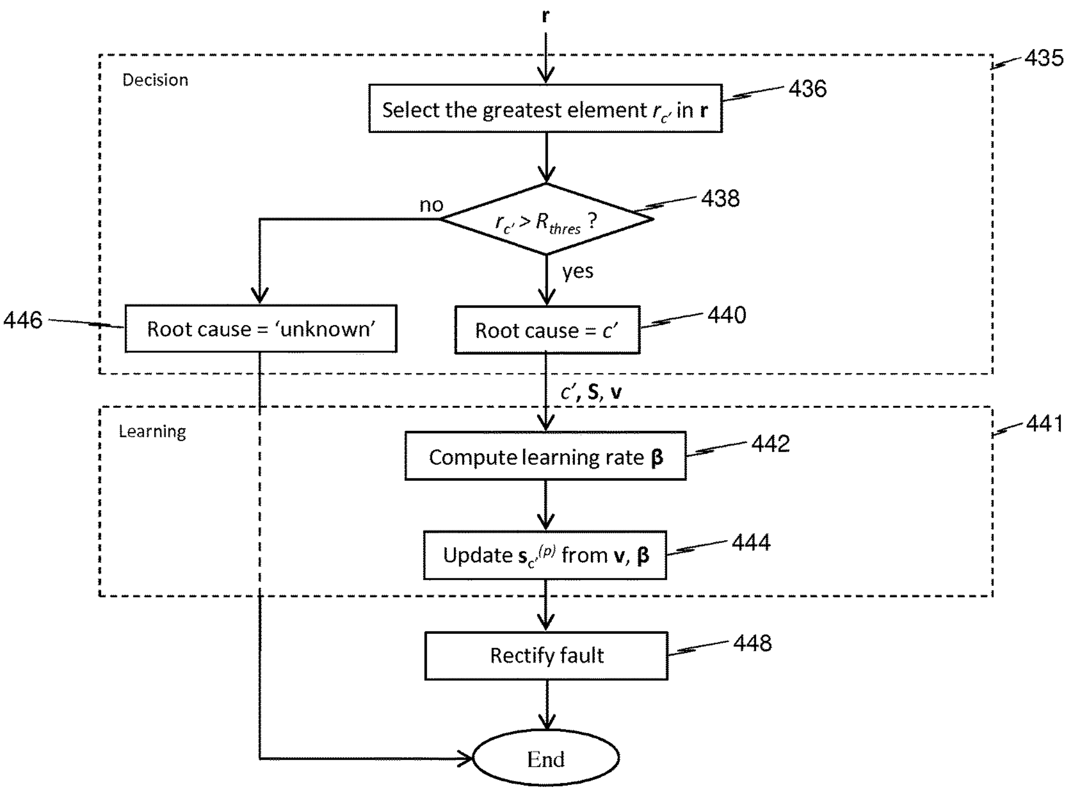
Figure 5:
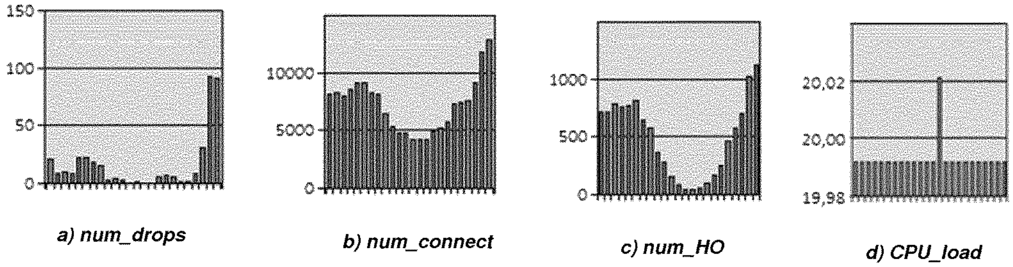
FIGS. 5*a*-5*d* show plots of samples of a primary network metric and a plurality of indicator network metrics over time.

An exemplary method of determining the fault cause is shown in box 435 of FIG. 4*c*. The fault determiner 222 may determine 436 the highest fault correlation value in the vector r. The fault determiner 222 then determines 438 whether the determined highest fault correlation value is above $R_{thres}$. If the highest fault correlation value is above $R_{thres}$ then the fault determiner 222 determines 440 that the fault cause associated with the fault highest correlation value is the actual cause c' of the present fault in the network. In exemplary methods and apparatus, if the threshold condition is not fulfilled, the cause is considered to be unknown 446 and the process is ended.

Exemplary methods and apparatus are able to learn 316 from new fault occurrences. An exemplary method of doing this is shown in box 441 of FIG. 4*c*. Given an occurrence of the fault k (corresponding to the cause of the problem c' previously identified), the learning entity 220 may update the row vector $s_k^{(p)}$ in the stored fault cause matrix $S^{(p)}$ according to some formula or filter to include this knowledge in the database 310. The resulting updated fault cause matrix is denoted by $S'^{(p)}$. In exemplary methods and apparatus, the use of a first order Infinite Impulse Response (IIR) filter may be used to update the fault cause matrix S. The learning entity 220 may update the row vector $s_k^{(p)}$ based on the following equation.

$$s'^{(p)}_k = \alpha\beta^{(p)} \cdot v_k^{(p)} + (1-\alpha\beta^{(p)}) \cdot s_k^{(p)},$$

where $s'^{(p)}_k$ refers to the row vector after the update is carried out, a is a user parameter that establishes the importance of past occurrences with respect to the last one and $\beta^{(p)}$ is a vector whose element $\beta^{(p)}_j$ may be determined by the following equation.

$$\beta_j^{(p)} = \operatorname{mean}\left(v_{\lambda(j)}^{(p)}, \ldots\, v_{\lambda(j)+M/(1+N_{neigh})}^{(p)}\right),$$

where $M/(1+N_{neigh})$ is the number of network metrics per cell and λ(j) is a function that returns the position of the first metric in $v^{(p)}$ that belongs to the same neighboring cell as the indicator network metric j. A high value of $\beta^{(p)}_j$ means that the indicator network metric j belongs to a cell whose correlation to the problem is significant and, thus, its impact on the matrix of stored cases should be greater.

Accordingly, the learning entity 220 may determine 442 $\beta^{(p)}$, and update 444 $s'^{(p)}_k$ using the equations above. The update may be carried out for all metrics that can act as primary network metrics. As a consequence, the vector $v^{(p)}$ should be calculated not only for the primary network metric p derived from the detection phase, but also for each potential network metric that can be a primary network metric in future occurrences of the fault.

The fault rectifier 224 may control the transmitter 202 to transmit data to another network entity to rectify 448 the determined fault. In exemplary methods and apparatus, this may happen directly after the determination 440 of the fault cause c'. The learning phase may be optional.

In summary, the configuration parameters of the disclosed methods and apparatus are briefly described below:

α is the parameter of the first order IIR filter used to update the fault causes of the database. This parameter defines the importance of past occurrences with respect to the last one.

F is the total number of stored fault causes. This number grows over time as new faults are included in the database.

L is the time interval at which the network metrics are collected.

M is the number of metrics, including all network metrics gathered from different cells, i.e. the primary and neighbor cells.

$N_{minHO}$ is the minimum number of handovers per unit time between two cells to be considered as neighbors. In this sense, adjacencies with low number of handovers are less likely to be affected by the faulty cell and can be discarded.

$N_{neigh}$ is the maximum number of neighbors for which all network metrics are gathered. In principle, this number should not be high (e.g. $N_{neigh}<5$), since the fault typically affects only a few cells. A lower value of this parameter also means lower computational cost.

$R_{thres}$ is the threshold used in the decision phase. This parameter defines the sensitivity to undiagnosed faults.

T is the length of the vectors where the information of the metrics is stored.

This value depends on the time interval L (e.g. one hour) at which each sample is collected and the total time (e.g. one day) of the data collection.

z is the maximum magnitude of the time shifts to detect correlation with delayed degradations on metrics. Its value should be low (e.g. z=2), since the faults usually have immediate impact on the network metrics. The configuration also depends on the time interval at which samples are collected.

Exemplary methods and apparatus support different implementations of the algorithms disclosed herein according to:

The selection of network metrics: the algorithm can operate with different kinds of network metrics (e.g. counters, performance indicators, etc.) and these network metrics can be collected from a plurality of cells in a heterogeneous network (e.g. intra-frequency cells, inter-RAT cells, overlaid cells, etc.).

The non-weighted metric correlation indicator: the implementation of this step is an open decision. In exemplary methods and apparatus, the absolute value of the Pearson correlation coefficient is used to calculate the correlation between two network metrics.

The shifted versions of network metrics to find delayed correlations: the inclusion of this feature in the invention provides better performance at the expense of a higher computational cost.

The update of the knowledge in the database: the aggregation of data of a new fault occurrence to the historical data of a certain fault is an open decision. In exemplary methods and apparatus, a first order IIR filter that determines the importance given to past occurrences is used.

The aggregation of expert knowledge (matrix E): the allocation of weights (i.e. the expert knowledge) to the network metrics given a fault is an open decision. In this invention, some guidelines are provided to support this task.

The aggregation of network metrics data (in addition to matrices C and E): certain metrics can be used to determine the weighting factor that gives more or less importance to the network metrics in the calculation of the weighted correlation (e.g. metrics related to geographical data or traffic).

The function f that generates the weighting factor: this function combines the expert knowledge and the network metrics data to produce the final weighting factor. In exemplary methods and apparatus, the proposed function is based on multiplying both factors.

The weighted correlation indicator: in this case, the most common correlation and distance-based indicators can be modified to support the use of weights. However, in exemplary methods and apparatus, a modified version of the Pearson correlation coefficient is proposed since weights can be easily included in the original formula of the coefficient.

To show the effectiveness of the methods and apparatus disclosed herein, an example is explained below. The data of the example are taken from a live Long-Term Evolution (LTE) network.

Inputs

Let the inputs of the proposed method be the following network metrics:

num_drops=number of dropped calls num_connect=number of user connections num_HO=number of intra-frequency handover (HO) attempts CPU_load=average CPU load estab_succ_rate=initial connection establishment success rate interRAT_HO_rate=Inter Radio Access Technology (RAT) HO rate avg_rssi=average received signal strength indicator bad coverage=number of reported bad coverage evaluations Let us assume that, in addition to the primary cell, two neighbor cells are considered ($N_{neigh}$=2). Then, the total number of metrics is 8·(1+2)=24 (i.e. M=24):

Metrics=[num_drops (primary_cell), num_connect (primary_cell), . . . , bad_coverage (primary_cell), num_drops (neigh cell_1), num_connect (neigh cell_1), . . . , bad_coverage (neigh cell_1), num_drops (neigh cell_2), num_connect (neigh cell_2), . . . , bad_coverage (neigh cell_2)].

For each network metric, samples are collected at the cell-level (one sample per hour) during the last 24 hours (i.e. L=1 hour and T=24). In addition, no time shifts are carried out over the samples, i.e. z=0 in this example.

Database

Let the database of the system include two faulty situations (F=2) that were found in the past: cell outage (fault 1) and overload (fault 2). Note that, in the first case, the network metrics of the cell in outage cannot be used since they are not available. Thus, this problem is typically found by analyzing other cells. For the sake of clarity, let us assume that only the network metric num_drops is adopted as primary network metric. With this information, the database (i.e. the matrix S) is composed of the data shown in Table 1 (expressed in percentages).

TABLE 1

Content of matrix S.

| | S | Primary cell | | | | | | | | Neighbor cell 1 | | | | | | | | Neighbor cell 2 | | | | | | | |
|---|---|---|---|---|---|---|---|---|---|---|---|---|---|---|---|---|---|---|---|---|---|---|---|---|---|
| | [%] | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Fault 1 | 1 | 100 | 83 | 74 | 12 | 82 | 68 | 56 | 87 | 66 | 80 | 61 | 65 | 67 | 66 | 31 | 93 | 71 | 71 | 56 | 0 | 43 | 77 | 46 | 91 |
| Fault 2 | 2 | 100 | 85 | 82 | 87 | 95 | 61 | 88 | 74 | 86 | 91 | 97 | 94 | 6 | 27 | 73 | 87 | 97 | 38 | 95 | 87 | 33 | 1 | 71 | 56 |

To explain the calculation of the values in Table 1, the following examples are provided. In particular, for fault 1, the metric correlation between num_drops and num_connect (an indicator network metric) of the primary cell (metrics 1 and 2, respectively) is 83%. The correlation between num_drops and num_HO (an indicator network metric) of the primary cell (metrics 1 and 3, respectively) is 74% and so on. In FIGS. 5*a-d*, the temporal evolution of each of these example metrics (m) during the studied time (last 24 hours) is shown. The represented time interval corresponds to the data used to calculate the metric correlation value. It can be observed that the last part of the interval is characterized by an abrupt change, meaning that the outage occurred at this time and then it was detected by a hypothetical pre-stage of fault detection through the primary network metric. As a consequence, some indicator network metrics are highly correlated, i.e. they are above 70%. Conversely, metric 4 (CPU_load), is not correlated to the primary network metric (num_drops), as its value is 12% (see FIG. 5*d*). This means that this indicator network metric is not affected by the cell outage. However, when the problem is an overload situation (fault 2), CPU_load and some other indicator network metrics are correlated to the primary network metric, as shown in Table 1. These two cases, cell outage and overload show similar effects as they have in common some degraded network metrics. However, in this poor-case situation, the methods and apparatus disclosed herein are able to identify the key network metrics in order to distinguish both problems.

The variable E representing the expert knowledge is defined in this example as shown in Table 2. In this case, the expert knowledge assumes that the symptoms in the primary cell are 40% relevant for determining the cause of the problem, while neighbor cells are 30% relevant each one. With this information and considering that the sum of each row must be equal to 1, the elements of the matrix E are those shown in Table 2.

TABLE 2

Content of matrix E

| | | Primary cell | | | | | | | | Neighbor cell 1 | | | | | | | | Neighbor cell 2 | | | | | | | |
|---|---|---|---|---|---|---|---|---|---|---|---|---|---|---|---|---|---|---|---|---|---|---|---|---|
| E | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Fault 1 | 1 | $\frac{0.4}{8}$ | $\frac{0.4}{8}$ | $\frac{0.4}{8}$ | $\frac{0.4}{8}$ | $\frac{0.4}{8}$ | $\frac{0.4}{8}$ | $\frac{0.4}{8}$ | $\frac{0.4}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ |
| Fault 2 | 2 | $\frac{0.4}{8}$ | $\frac{0.4}{8}$ | $\frac{0.4}{8}$ | $\frac{0.4}{8}$ | $\frac{0.4}{8}$ | $\frac{0.4}{8}$ | $\frac{0.4}{8}$ | $\frac{0.4}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ | $\frac{0.3}{8}$ |

Calculation of v

Let us now suppose that a new case arrives to the system. After applying the correlation function, the vector v' represented in Table 3 is built.

TABLE 3

Content of vector v'

| | | Primary cell | | | | | | | | Neighbor cell 1' | | | | | | | | Neighbor cell 2' | | | | | | | |
|---|---|---|---|---|---|---|---|---|---|---|---|---|---|---|---|---|---|---|---|---|---|---|---|---|
| v' [%] | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| | 1 | 100 | 87 | 82 | 7 | 68 | 88 | 39 | 90 | 64 | 50 | 68 | 0 | 61 | 84 | 71 | 82 | 68 | 75 | 79 | 17 | 83 | 80 | 72 | 82 |

Then, the average metric correlation values for neighboring cells 1 and 2 are calculated: 60 and 69.5%, respectively. After this, the neighboring cells are sorted according to these average values. In this case, cell 1 and 2 are swapped, as shown in Table 4.

TABLE 4

Content of vector v

| | | Primary cell | | | | | | | | Neighbor cell 1 (=2') | | | | | | | | Neighbor cell 2 (=1') | | | | | | | |
|---|---|---|---|---|---|---|---|---|---|---|---|---|---|---|---|---|---|---|---|---|---|---|---|---|
| v [%] | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| | 1 | 100 | 87 | 82 | 7 | 68 | 88 | 39 | 90 | 68 | 75 | 79 | 17 | 83 | 80 | 72 | 82 | 64 | 50 | 68 | 0 | 61 | 84 | 71 | 82 |

Calculation of C

The next step is the calculation of the variable C that contains information about the magnitude of the problem regarding the heterogeneous scenario. In particular, the higher the average metric correlation, the greater the impact on the neighboring cell. Thus, the average metric correlation values for both the input and the stored cases are calculated, as shown in Table 5.

TABLE 5

Average metric correlation values

| | Primary cell | Neighbor cell 1 (=2') | Neighbor cell 2 (=1') |
|---|---|---|---|
| Input | 70 | 69 | 60 |
| Fault 1 | 70 | 66 | 57 |
| Fault 2 | 84 | 70 | 60 |

Once these values are generated, the element of the matrix C is computed as the minimum value between the average correlation of the input and the average correlation of the corresponding fault, as shown in Table 6. For example, the element (2,1) is calculated as: min(70,84)=70; the element (1,9) is calculated as: min(69,66)=66.

TABLE 6

| Non-normalized values of matrix C | | | | | | | | | | | | | | | | | | | | | | | | | |
|---|---|---|---|---|---|---|---|---|---|---|---|---|---|---|---|---|---|---|---|---|---|---|---|---|---|
| | | Primary cell | | | | | | | | Neighbor cell 1 | | | | | | | | Neighbor cell 2 | | | | | | | |
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Fault 1 | 1 | 70 | 70 | 70 | 70 | 70 | 70 | 70 | 70 | 66 | 66 | 66 | 66 | 66 | 66 | 66 | 66 | 57 | 57 | 57 | 57 | 57 | 57 | 57 | 57 |
| Fault 2 | 2 | 70 | 70 | 70 | 70 | 70 | 70 | 70 | 70 | 69 | 69 | 69 | 69 | 69 | 69 | 69 | 69 | 60 | 60 | 60 | 60 | 60 | 60 | 60 | 60 |

The final step to produce the values of the variable C is normalization so that the sum of each row is equal to 1, as shown in Table 7. For example, the element (1,1) is 70/(8·70+8·66+8·57); the element (2,1) is 70/(8·70+8·69+8·60).

TABLE 7

| Content of matrix C | | | | | | | | | | | | | |
|---|---|---|---|---|---|---|---|---|---|---|---|---|---|
| | | Primary cell | | | | | | | | Neighbor cell 1 | | | |
| | C | 1 | 2 | 3 | 4 | 5 | 6 | 7 | 8 | 9 | 10 | 11 | 12 |
| Fault 1 | 1 | 0.045 | 0.045 | 0.045 | 0.045 | 0.045 | 0.045 | 0.045 | 0.045 | 0.043 | 0.043 | 0.043 | 0.043 |
| Fault 2 | 2 | 0.044 | 0.044 | 0.044 | 0.044 | 0.044 | 0.044 | 0.044 | 0.044 | 0.043 | 0.043 | 0.043 | 0.043 |
| | | Neighbor cell 1 | | | | Neighbor cell 2 | | | | | | | |
| | C | 13 | 14 | 15 | 16 | 17 | 18 | 19 | 20 | 21 | 22 | 23 | 24 |
| Fault 1 | 1 | 0.043 | 0.043 | 0.043 | 0.043 | 0.037 | 0.037 | 0.037 | 0.037 | 0.037 | 0.037 | 0.037 | 0.037 |
| Fault 2 | 2 | 0.043 | 0.043 | 0.043 | 0.043 | 0.038 | 0.038 | 0.038 | 0.038 | 0.038 | 0.038 | 0.038 | 0.038 |

Calculation of W

After calculating the variables C and E, the final weighting factor W can be computed. In this exemplary case, to combine C and E, each element of C is multiplied by the corresponding element of E and the resulting rows are normalized as in previous steps. The obtained matrix W is represented in Table 8.

TABLE 8

| Content of matrix W | | | | | | | | | | | | | |
|---|---|---|---|---|---|---|---|---|---|---|---|---|---|
| | | Primary cell | | | | | | | | Neighbor cell 1 | | | |
| | W | 1 | 2 | 3 | 4 | 5 | 6 | 7 | 8 | 9 | 10 | 11 | 12 |
| Fault 1 | 1 | 0.054 | 0.054 | 0.054 | 0.054 | 0.054 | 0.054 | 0.054 | 0.054 | 0.038 | 0.038 | 0.038 | 0.038 |
| Fault 2 | 2 | 0.052 | 0.052 | 0.052 | 0.052 | 0.052 | 0.052 | 0.052 | 0.052 | 0.039 | 0.039 | 0.039 | 0.039 |
| | | Neighbor cell 1 | | | | Neighbor cell 2 | | | | | | | |
| | W | 13 | 14 | 15 | 16 | 17 | 18 | 19 | 20 | 21 | 22 | 23 | 24 |
| Fault 1 | 1 | 0.038 | 0.038 | 0.038 | 0.038 | 0.033 | 0.033 | 0.033 | 0.033 | 0.033 | 0.033 | 0.033 | 0.033 |
| Fault 2 | 2 | 0.039 | 0.039 | 0.039 | 0.039 | 0.034 | 0.034 | 0.034 | 0.034 | 0.034 | 0.034 | 0.034 | 0.034 |

Calculation of r

Once the weighting factor W and the metric correlation values v are computed, the weighted fault correlation vector r can be calculated. Table 9 shows the calculated fault correlation values of the vector r.

TABLE 9

| Content of vector r | | |
|---|---|---|
| | r [%] | 1 |
| Fault 1 | 1 | 77 |
| Fault 2 | 2 | −20 |

Decision

The decision phase is given by the greatest fault correlation value, in this case, corresponding to fault 1. Assuming that $R_{thres}$ is equal to 70 in this example, the correlation value is also greater than this threshold (77%>70). Thus, it can be concluded that the root cause of the input is fault 1. Since the real cause of this problem is a cell outage, the diagnosis of the proposed method is correct.

Learning

To update the internal database, the existing case (i.e. the first row of matrix S is) is combined with the new cell outage case given by the vector v. After applying the first order IIR filter (α=0.5), the updated matrix S' of stored fault causes is shown in Table 10.

TABLE 10

Updated matrix S'.

| | S' | Primary cell | | | | | | | | Neighbor cell 1 | | | | | | | | Neighbor cell 2 | | | | | | | |
|---|---|---|---|---|---|---|---|---|---|---|---|---|---|---|---|---|---|---|---|---|---|---|---|---|---|
| | [%] | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Fault 1 | 1 | 100 | 84 | 77 | 10 | 77 | 75 | 50 | 88 | 67 | 78 | 67 | 48 | 73 | 71 | 45 | 89 | 69 | 65 | 60 | 0 | 48 | 79 | 53 | 88 |
| Fault 2 | 2 | 100 | 85 | 82 | 87 | 95 | 61 | 88 | 74 | 86 | 91 | 97 | 94 | 6 | 27 | 73 | 87 | 97 | 38 | 95 | 87 | 33 | 1 | 71 | 56 |

Analysis of the Impact of a Less Correlated Neighboring Cell

When a given fault affects fewer cells than the number of neighboring cells $N_{neigh}$, there are neighboring cells whose correlation to the primary cell is low. Let us suppose that the analyzed case is modified to study this effect. In particular, let us assume that the neighboring cell 1' is less correlated to the network fault, as shown in the vector v' represented in Table 11.

TABLE 11

Content of vector v' when neighbor cell 1' is less correlated to the problem.

| | Primary cell | | | | | | | | Neighbor cell 1' | | | | | | | | Neighbor cell 2' | | | | | | | |
|---|---|---|---|---|---|---|---|---|---|---|---|---|---|---|---|---|---|---|---|---|---|---|---|---|
| v' [%] | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 100 | 87 | 82 | 7 | 68 | 88 | 39 | 90 | 5 | 36 | 77 | 0 | 8 | 60 | 12 | 59 | 68 | 75 | 79 | 17 | 83 | 80 | 72 | 82 |

With this new case, the weighting factor (in particular, the component C) reduces the impact of the network metrics of neighboring cell 1' and results are less affected. Table 12 shows the values of the vector r. As observed, the correlation value between the input and fault 1 is rather similar to the original case (see Table 9). Again, the root cause is clearly fault 1.

TABLE 12

Content of vector r when neighbor cell 1' is less correlated to the problem.

| | r [%] | 1 |
|---|---|---|
| Fault 1 | 1 | 82 |
| Fault 2 | 2 | 39 |

To evaluate the effectiveness of the component C of the weighting factor W, the results of this example are compared to the case in which the matrix C is not used, i.e. W=E. Table 13 represents the correlation vector r, showing that the problem cannot be correctly diagnosed since the condition related to the threshold $R_{thres}$ is not fulfilled. Thus, it can be said that the correlation analysis is greatly improved by the use of matrix C.

TABLE 13

Content of vector r when neighbor cell 1' is less correlated to the problem and component C is not used.

| | r [%] | 1 |
|---|---|---|
| Fault 1 | 1 | 67 |
| Fault 2 | 2 | −2 |

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An apparatus for determining a cause of a fault in a network, the apparatus comprising:

a receiver configured to receive a plurality of time separated samples of a primary network metric (mp) that are indicative of a fault in the network, and a plurality of time separated samples of one or more indicator network metrics (mj);

a processor configured to determine one or more metric correlation values (v) relating to dependences between the samples of the primary network metric and the samples of each of the one or more indicator network metrics, the processor being further configured to determine one or more fault correlation values (r) relating to dependences between the one or more metric correlation values and a plurality of stored metric correlation values (S) associated with a fault cause; and the processor configured to determine a cause of the fault based on the one or more fault correlation values.

2. An apparatus according to claim 1, wherein the processor is further configured to determine a weighting factor (W), wherein the processor is configured to determine the one or more fault correlation values (r) using a weighted correlation based on the weighting factor.

3. An apparatus according to claim 2, wherein the processor is configured to determine the weighting factor (W) based on one or more of the stored metric correlation values (S) and data (E) indicating a relevance of one or more indicator network metrics to each fault cause.

4. An apparatus according to claim 1, wherein the processor is configured to shift the samples of the one or more indicator network metrics (mj) before determining the metric correlation values (v).

5. An apparatus according to claim 4, wherein the processor is configured to determine a plurality of candidate metric correlation values relating to dependences between the samples of the primary network metric and the samples of one or more of the indicator network metrics (mj), each candidate correlation value based on differently shifted samples of the one or more indicator network metrics, and wherein the processor is further configured to select the candidate metric correlation value having the highest correlation value as the metric correlation value (v).

6. An apparatus according to claim 1, wherein the plurality of time separated samples of one or more indicator network metrics (mj) comprise samples from indicator network metrics measured in a plurality of telecommunications cells, and wherein the processor is further configured to build a vector of metric correlation values ordered based on the telecommunications cell in which a corresponding indicator network metric was measured.

7. An apparatus according to claim 6, wherein the processor is configured to group together metric correlation values relating to the same telecommunications cell.

8. An apparatus according to claim 7, wherein the processor is configured to determine an average metric correlation value relating to each telecommunications cell and to order the grouped together metric correlation values based on the average metric correlation value.

9. An apparatus according to claim 1, wherein the processor is configured to determine that the cause of the fault is a fault cause associated with the highest fault correlation value.

10. An apparatus according to claim 1, wherein the processor is further configured to determine updated stored metric correlation values (S') based on the determined cause of the fault and the stored metric correlation values (S).

11. An apparatus according to claim 10, wherein the processor is configured to determine the updated stored metric correlation values (S') using an infinite impulse response filter.

12. An apparatus according to claim 1, wherein the processor is further configured to control a transmitter to transmit a signal to an entity in the network to rectify the determined cause of the fault.

13. An apparatus according to claim 1, wherein the one or more metric correlation values (v) are components of a metric correlation vector (v), and wherein the one or more fault correlation values (r) are components of a fault correlation vector (r).

14. A method for determining a cause of a fault in a network, the method comprising:

receiving, at a receiver, a plurality of time separated samples of a primary network metric (mp) that are indicative of a fault in the network, and a plurality of time separated samples of one or more indicator network metrics (mj);

determining, by a processor, one or more metric correlation values (v) relating to dependences between the samples of the primary network metric and the samples of each of the one or more indicator network metrics;

determining, by the processor, one or more fault correlation values (r) relating to dependences between the one or more metric correlation values and a plurality of stored metric correlation values (S) associated with a fault cause; and determining, by the processor, a cause of the fault based on the one or more fault correlation values.

15. A method according to claim 14, further comprising determining, by the processor, a weighting factor (W), the step of determining, by the processor, the one or more fault correlation values (r) is undertaken using a weighted correlation based on the weighting factor.

16. A method according to claim 14, wherein the weighting factor (W) is determined based on one or more of the stored metric correlation values (S) and data (E) indicating a relevance of one or more indicator network metrics to each fault cause.

17. A method according to claim 14, further comprising shifting, by the processor, the samples of the one or more indicator network metrics (mj) before determining the metric correlation values (v).

18. A method according to claim 17, further comprising:

determining, by the processor, a plurality of candidate metric correlation values relating to dependences between the samples of the primary network metric and the samples of one or more of the indicator network metrics (mj), each candidate correlation value based on differently shifted samples of the one or more indicator network metrics; and selecting, by the processor, the candidate metric correlation value having the highest correlation value as the metric correlation value (v).

19. A method according to claim 14, wherein the plurality of time separated samples of one or more indicator network metrics (mj) comprise samples from indicator network metrics measured in a plurality of telecommunications cells, and wherein the method further comprises building, by the processor, a vector of metric correlation values ordered based on the telecommunications cell in which a corresponding indicator network metric was measured.

20. A method according to claim 19, wherein the processor groups together metric correlation values relating to the same telecommunications cell.

* * * * *